Feb. 4, 1969 G. M. FARRINGTON, JR., ET AL 3,425,852
BASIC REFRACTORY LINING BRICK AND PROCESS
Filed March 25, 1966 Sheet 1 of 3

INVENTORS
Grant M. Farrington, Jr.
Joseph L. Stein
Walter S. Treffner

ATTORNEYS

Feb. 4, 1969   G. M. FARRINGTON, JR., ET AL   3,425,852
BASIC REFRACTORY LINING BRICK AND PROCESS
Filed March 25, 1966

INVENTORS
Grant M. Farrington, Jr.
Joseph L. Stein
Walter S. Treffner

ATTORNEYS

Feb. 4, 1969  G. M. FARRINGTON, JR., ET AL  3,425,852
BASIC REFRACTORY LINING BRICK AND PROCESS
Filed March 25, 1966  Sheet 3 of 3

INVENTORS
Grant M. Farrington, Jr.
Joseph L. Stein
Walter S. Treffner

ATTORNEYS

United States Patent Office 3,425,852
Patented Feb. 4, 1969

3,425,852
BASIC REFRACTORY LINING
BRICK AND PROCESS
Grant M. Farrington, Jr., Marlton, and Joseph L. Stein, Cherry Hill, N.J., and Walter S. Treffner, Linthicum Heights, Md., assignors to General Refractories Company, Philadelphia, Pa., a corporation of Pennsylvania
Filed Mar. 25, 1966, Ser. No. 537,396
U.S. Cl. 106—58　　24 Claims
Int. Cl. C04b 35/04; C21b 7/04

ABSTRACT OF THE DISCLOSURE

The present invention relates to methods of making improved basic refractory brick for linings of steel making furnaces such as oxygen steel making furnaces in which the lining brick is in contact with the molten charge. The invention is concerned with improving the resistance of pitch (including tar) bonded basic refractory brick to erosion by molten materials, by suppression or elimination of fine particles and combining coarse and intermediate sized particles in particular ranges and proportions. The invention increases the strength of the brick, reduces the cost, and facilitates tempering. The invention also makes it easier to protect against moisture degradation.

DESCRIPTION OF INVENTION

A purpose of the invention is to mold coarse basic refractory particles, which preferably will consist of coarse-coarse particles and fine-coarse particles, and intermediate sized basic refractory particles, in the proportions of from 55 to 90% by weight and preferably from 60 to 80% by weight of coarse particles in the size range between 2½ and 28 mesh per linear inch, and from 10 to 45% by weight and preferably from 20 to 40% by weight of intermediate sized particles of a size range between 28 and 325 mesh per linear inch, employing not in excess of 7% of basic refractory particles finer than 325 mesh per linear inch and preferably substantially omitting basic refractory particles finer than 325 mesh per linear inch, to bond the brick by pitch (or tar), the concentration of pitch (tar) being between 3 and 8% and preferably between 5 to 7% by weight of the dry refractory, to mold the mix at a temperature above the softening point of the pitch (tar) at a pressure in excess of 10,000 and then temper the molded brick at a temperature between 400 and 600° F. (preferably between 525 and 600° F.) for a time of at least five hours, preferably at least 15 hours, and most desirably at least 20 hours, to eliminate the soft zone during a temperature gradient heating and to produce improved resistance to erosion by molten slag and metal.

A further purpose in a pitch (tar) bonded basic refractory lining brick especially for the lining of a basic oxygen furnace is to obtain a combination of the following properties in the tempered brick:

Compressive strength at 300° F. more than 100 p.s.i. and preferably more than 400 p.s.i.

Carbon residue higher than 68% and preferably higher than 71% of the weight of pitch (or tar) used.

Erosion in O.S.M. slag erosion test less than 0.15 inch and preferably less than 0.05 inch.

A further purpose is to produce a basic refractory brick made from a material which will preferably be magnesia such as periclase or dead burned magnesite, but may be calcined dolomite, calcined lime or a mixture of the same or other suitable basic refractory which will have an improved strength when properly sized and blended, and molded under a pressure of 10,000 p.s.i. to 15,000 p.s.i.

A further purpose is to eliminate the expense of fine grinding and to minimize the dusting and handling problem incident to including a component finer than 325 mesh per linear inch.

A further purpose is to enhance tempered brick properties in a basic refractory brick for lining a steel making furnace.

A further purpose is to simplify the problem of hydration in basic refractory brick by eliminating the need to protect the very fine particles such as ball mill fines against hydration in view of their extreme surface activity, particularly where the basic refractory employed is dolomitic.

A further purpose is to overcome the difficulties of heating granular material containing ball mill fines or dust-like particles which may be carried out in hot air currents in some heating devices.

Further purposes appear in the specification and in the claims.

The drawings illustrate test mechanism employed in performing tests described in the specification.

Figure 1:
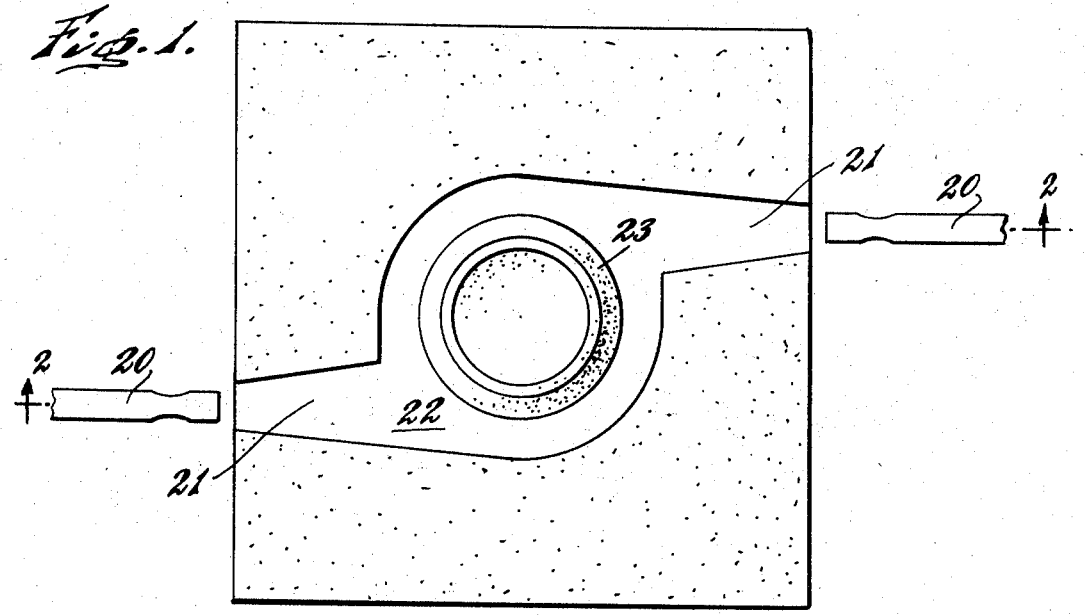
FIGURE 1 is a diagrammatic horizontal section of a pig iron melting furnace for use in the O.S.M. slag erosion test, the section being taken on the line 1—1 of FIGURE 2.

In the prior art in manufacture of basic refractory brick it has long been known that in many cases improved density can be obtained by employing coarse particles and fine particles, omitting intermediate size particles. See Heuer U.S. Patents 1,851,181; 1,992,482 and 2,068,411. It had been considered that these principles are applicable to basic refractory brick which are bonded with pitch, and when reference is made to pitch it is intended to include tar, as later explained.

Pitch bonded brick have been found to be very effective for use in linings of steel making furnaces, especially basic oxygen steel making furnaces. It has, however, been found that for such service even pitch bonded brick leave much to be desired, and it would be highly desirable to increase the resistance to erosion while maintaining other properties related to performance in service such as the 300° F. compression test values and the high carbon residues contributed by tempering. As a result of an extensive experimental program, we find that very superior performance in a furnace lining in contact with molten metal and slag of basic oxygen steel making can be secured by the following combination of properties in a tempered pitch (tar) bonded basic refractory brick. By a tempered brick we mean that the brick after molding has been heated to a temperature of 400 to 600° F. (preferably 525 to 600° F.) for a time of at least five hours, preferably at least 15 hours and most desirably at least 20 hours. The properties shall be:

Compressive strength at 300° F. more than 100 p.s.i. and preferably more than 400 p.s.i.

Carbon residue higher than 68% and preferably higher than 71% by weight of the pitch (tar) used.

Erosion by molten slag in the O.S.M. slag erosion test not in excess of 0.15 inch and preferably not in excess of 0.05 inch, when a standard burned periclase brick of 95% MgO erodes of the order of 0.05 to 0.15 inch.

We have discovered that an important factor in obtaining these properties is omission or suppression of fine particles, for example ball mill fines, that is, basic refractory particles finer than 325 mesh per linear inch. We preferably will substantially eliminate these fines as far as practical in screen separation or at least use not more than 7% of them.

We combine this omission or suppression of refractory fines with a correct size and proportion of coarse particles and intermediate size particles, both of basic refractory such as magnesia, calcined dolomite, low flux dolomite, calcined lime, suitable forsteritic basic refractory or other suitable basic refractory or a mixture thereof. When magnesia is referred to, it is intended to include dead burned magnesite, dead burned magnesia from sea water or brine, and other suitable magnesia.

The coarse particles should be in the size range between 2½ and 28 mesh per linear inch, and they preferably will consist of coarse-coarse particles which will be in the range between 2½ mesh and 8 mesh and fine-coarse particles which will be in the range of between 6 and 28 mesh.

The coarse-coarse particles are defined as follows: A maximum of 10% by weight on 2½ mesh, a minimum of 90% by weight on 8 mesh.

The fine-coarse particles may be defined as follows: A maximum of 10% by weight on 6 mesh, a minimum of 90% by weight on 28 mesh.

The proportion of coarse particles will be between 55 and 90% by weight and preferably between 60 and 80% by weight.

When a mixture of coarse-coarse and fine-coarse particles is used, the concentration of coarse-coarse particles should be in the range between 27.5 and 42.5%, and the percentage of fine-coarse particles should be in the range between 27.5 and 42.5% by weight.

The intermediate particles will be in the size range between 28 mesh and 325 mesh and the concentration of intermediate particles will be between 10 and 45% by weight and preferably between 20 and 40% by weight.

The fine particles which are called ball mill fines ordinarily have 60% by weight through 325 mesh, preferably 80%, and most desirably 90% by weight through 325 mesh.

In some cases there may be a gap in size between the coarse particles and the intermediate particles.

The pitch or tar used in the present invention may be of a wide variety of properties, and it will be hot mixed with the particles, either separately with the coarse particles and the intermediate particles or with a mixture of coarse and intermediate particles at a temperature above the softening point. The concentration of pitch (or tar) should be between 3 and 8% by weight and preferably between 5 and 7% by weight of the dry refractory mix.

The pitch (tar) will ordinarily be in a range of softening point between 55 and 140° C., although higher temperature pitches (tars) can be used, if desired. The softening point at the higher levels is measured by the cube-in-air method, as defined in the publication of Allied Chemical Corporation, Industrial Tar Products Sales, Plastics Division, test designation D–7–IR of June 9, 1961. The values given are about 12° lower than those derived by the cube-in-water method, ASTM specification D61. For lower softening points the ring-and-ball method is used, ASTM specification D36.

Three suitable pitches are described as follows:

Pitch A:
　Softening point cube-in-air, ° C. _____ 105–115
　Conradson coking value, percent by weight
　　min. _____ 52
　Quinoline insolubles, percent by weight ___ 5–15
　Benzene insolubles, percent by weight ____ 5–24
　Distillation from 0–360° C., percent by
　　weight max. _____ 5

Pitch B:
　Softening point cube-in-air, ° C. _____ 88–93
　Conradson coking value, percent by weight
　　min. _____ 35
　Quinoline insolubles, percent by weight ___ 1–5
　Benzene insolubles, percent by weight ____ 10–20
　Distillation from 0–360° C., percent by
　　weight max. _____ 5

Pitch C:
　Softening point ring-and-ball, ° C. _____ 55–60
　Conradson coking value, percent by weight
　　max. _____ 40
　Quinoline insolubles, percent by weight __ 5–10
　Benzene insolubles, percent by weight ____ 15–23

The tars used will suitably be according to ASTM specification D490–47, grades RT6–12 inclusive. The distillation residues of these tars have a softening point by the ring-and-ball method of either 35–70° C. or 40–70° C.

When reference is made in the claims to pitch it includes tar.

The preferred method of molding is as follows:

1. Coarse basic refractory grains having been graded according to size are preheated above the softening point of the pitch (tar), say 200° C., and mixed in the correct proportions with pitch (tar) also heated above the softening point.

2. Intermediate particles are graded according to size and then preheated to a temperature well above the softening point, say 200° C., and mixed with pitch (tar) also heated to a temperature above the softening point.

3. As an alternative procedure, forming no part of the present invention, the coarse and intermediate particles can be first blended before being preheated and thereafter mixed with the hot pitch (tar). In any case a blend of coarse and intermediate particles is made of the correct proportions as above set forth.

3(a). While fine particles will preferably be omitted, where they are to be used they will be preheated to a temperature above the pitch (tar) softening point and then mixed with hot pitch (tar) in like manner as described above.

4. The mixture of coarse and intermediate particles, preferably without fine particles, heated to a temperature well above the softening point, say 150° C., is then molded under a pressure that will produce a high rather than a low density as later explained. We find that the minimum effective molding pressure for present purposes is 10,000 pounds per square inch. It will be evident, however, that the pressure required will vary slightly with the melting point of the pitch (tar) and the particular temperature employed. It is not considered necessary to mold at a pressure exceeding 15,000 p.s.i.

5. After molding, the brick are tempered in a suitable chamber such as a tunnel drier at a temperature of 400–

600° F. and preferably at a temperature of 525–600° F. for a time of at least five hours, preferably at least fifteen hours and most desirably at least twenty hours. During tempering volatiles are given off, but other changes take place which greatly improve the performance of the basic refractory brick in a furnace lining.

Tempering at temperatures above 600° F. is counterindicated, because it may tend to degrade other properties of the brick without compensating benefit.

6. The brick after tempering are suitable for use in a furnace lining for a steel furnace without kiln firing and desirably do not require strict adherence to a given critical heatup or burn-in schedule.

By this procedure, we obtain pitch (tar) bonded basic refractory brick of high density which give extraordinary performance under contact with a melt such as the slag of a steel making furnace. Not only do the brick resist erosion exceptionally, but they are also of unusual strength.

The brick of the invention are less expensive to make not only because fine grinding is rendered unnecessary but also because the heating of the fine component and mixing with the pitch (tar) is avoided and the dusting incident to handling ball mill fines is reduced.

Some pitch (tar) bonded basic refractory brick are difficult to temper, but the brick of the present invention are very easy, indeed, to temper.

Many pitch (tar) bonded brick of the prior art have been very active in contact with moist atmospheres, preferably because of the active surface chemistry of the very fine particles. This has necessitated in some cases protecting by coatings of oils and the like. The suppression or elimination of the ball bill fines in the present invention has to a great extent avoided this problem.

Heating of the ball mill fines with pitch or tar in the prior art was rather difficult because of the tendency to lose fines from the heater and the avoidance of use of ball mill fines is therefore a great advantage in the present invention.

Without limiting to any particular theory, certain theoretical comments can be made for better understanding of the invention.

One of the explanations of the greater resistance of the basic refractory brick of the present invention to slag erosion is the absence of the fine particles which are unusually active from a surface chemistry standpoint. The coarse and intermediate particles are believed to be less reactive from a surface chemistry standpoint. Some of the functions that would otherwise be performed in the brick of the invention by the ball mill fines are believed to be performed by the carbonaceous material which tends to form a web among the particles; tends to weld the interfaces of the particles; assures that a structurally sound matrix is present and tends to fill voids which would otherwise be left. The carbon may, as many people believe, resist wetting of the basic refractory by the metal and slag. There are, of course, metalloids in the molten pig iron which tend to form gas and may form a protective interface between the basic refractory and the melt.

The basic refractory itself, for example magnesia, may tend to recrystallize or form spinel, and the carbon may provide an inert medium between the grains which prevents diffusion and inhibits recrystallization or formation of spinel. The carbon is of inherent great strength at high temperature.

A series of experiments set forth below shows the properties obtained applying the molding technique above described for a pitch bonded magnesia brick using 110° C. softening point pitch in concentrations set forth in the tables and using particles of a size and concentration set forth below.

Table 1 shows the screen analysis for dead burned Austrian high lime magnesite, Type 1, coarse-coarse particles.

Table 1

Screen analyis of Type 1 dead burned Austrian high lime magnesite coarse-coarse particles.

| Screen: | Cum., percent |
|---|---|
| 2½ | 4.4 |
| 3 | 12.1 |
| 4 | 44.6 |
| 6 | 78.4 |
| 8 | 94.6 |
| 10 | 98.8 |
| 14 | 99.4 |
| Pan | (0.6) |

Table 2 shows the screen analysis for dead burned Austrian high lime magnesite, Type 1, fine-coarse particles.

Table 2

Screen analysis of dead burned Austrian high lime magnesite, Type 1, fine-coarse particles.

| Screen: | Cum., percent |
|---|---|
| 4 | 0.0 |
| 6 | 1.0 |
| 8 | 16.6 |
| 10 | 47.9 |
| 14 | 72.4 |
| 20 | 89.8 |
| 28 | 96.5 |
| 35 | 98.0 |
| Pan | (2.0) |

Table 3 shows the screen analysis of dead burned Austrian high lime magnesite, Type 1, intermediate particles.

Table 3

Screen analysis of dead burned Austrian high lime magnesite, Type 1, intermediate particles.

| Screen: | Cum., percent |
|---|---|
| 14 | 0.1 |
| 20 | 0.8 |
| 28 | 3.8 |
| 35 | 7.2 |
| 48 | 10.9 |
| 65 | 21.6 |
| 100 | 53.2 |
| 200 | 86.7 |
| 325 | 95.2 |
| Pan | (4.8) |

Table 4 shows the screen analysis for dead burned Austrian high lime magnesite, Type 1, ball mill fines, one of the grades used in the experiments.

Table 4

Screen analysis of dead burned Austrian high lime magnesite, Type 1, ball mill fines.

| Screen: | Cum., percent |
|---|---|
| 65 | 0.3 |
| 100 | 1.2 |
| 200 | 16.7 |
| 325 | 41.6 |
| Pan | (58.4) |

Table 5 shows the screen analysis for synthetic dead burned magnesia ball mill fines, another grade used in the experiments.

Table 5

Screen analysis of synthetic dead burned magnesia ball mill fines.

| Screen: | Cum., percent |
|---|---|
| 48 | 0.1 |
| 65 | 0.3 |
| 100 | 1.3 |
| 200 | 10.8 |
| 325 | 25.1 |
| Pan | (74.9) |

Table 6 shows the chemical analysis of dead burned Austrian high lime magnesite, Type 1.

Table 6

Chemical analysis of dead burned Austrian high lime magnestie, Type 1.

CaO _____ percent__ 4.95
$SiO_2$ _____ do____ 1.87
MgO _____ Substantially balance.

While the composition listed in Table 6 above is of the character generally known in the art as Type 1 magnesia, it will be evident that the principles of the invention are applicable to Type 2 magnesia and so-called 95% sea water or naturally occurring magnesia and a wide variety of other types of magnesia without limitation to a particular analysis. The invention is also applicable to other materials such as the dolomitic materials referred to above.

Table 7 shows the chemical analysis of synthetic dead burned magnesia above referred to.

Table 7

Chemical analysis of synthetic dead burned magnesia.

| | Percent |
|---|---|
| CaO | 0.8 |
| $SiO_2$ | 5.4 |
| Mgo | 92 |

Table 8 gives concentration of dead burned Austrian magnesite coarse-coarse particles, fine-coarse particles, intermediate particles, and ball mill fines, of synthetic magnesia ball mill fines, 110° C. softening point pitch and added materials such as scrap and bats for eleven different examples, all of which were molded under a pressure of 12,000 p.s.i. and tempered at a temperature range of 525–600° F. for twenty hours.

TABLE 8

| Mix No | 281 | 282 | 283 | 614 | 614A | 614B | 318 | 319 | 320 | 321 | 322 |
|---|---|---|---|---|---|---|---|---|---|---|---|
| Austrian coarse-coarse, percent | 27.5 | 30.0 | 32.5 | 55.0 | 55.0 | 55.0 | 35.0 | 37.5 | 40.0 | 42.5 | 32.5 |
| Austrian fine-coarse, percent | 27.5 | 30.0 | 32.5 | | | | 35.0 | 37.5 | 40.0 | 42.5 | 32.5 |
| Austrian intermediate, percent | 15.0 | 15.0 | 15.0 | 15.0 | 15.0 | 15.0 | 15.0 | 15.0 | 15.0 | 15.0 | 35.0 |
| Austrian ball mill fines, percent | 13.0 | 11.0 | 9.0 | 15.0 | 15.0 | 15.0 | 7.0 | 4.0 | 2.0 | | |
| Synthetic ball mill fines, percent | 17.0 | 14.0 | 11.0 | 15.0 | 15.0 | 15.0 | 8.0 | 6.0 | 3.0 | | |
| Pitch 110° C. added, percent | 5.8 | 5.8 | 5.8 | 5.5 | 5.5 | 5.5 | 5.8 | 5.8 | 5.8 | 5.8 | 5.8 |
| Added, percent | | | | ¹15.0 | ²15.0 | ¹15.0 | | | | | |

¹ Bats.    ² Scrap.

Table 9 gives the properties of the refractory brick produced in these examples. It will be understood that Experiments 281, 282, 283, 614, 614A, 614B, 318 and 319 show either suitable prior art brick or brick which were not of exceptional properties for use in a steel making furnace lining of the present invention. In several of the cases different values are given one below another. For example, the green and tempered brick in some cases had a high density obtained by molding at 12,000 p.s.i. and also a lower density obtained by molding at a lower pressure in the range of 7,000 p.s.i. to 8,000 p.s.i. and numerous tests show a value for the high pressure molded brick and a value for the low pressure molded brick. Only the high pressure molded brick as shown in experiments 320, 321 and 322 show the exceptional properties of the product of the present invention in respect to com-

TABLE 9

| Mix No | 281 | 282 | 283 | 614 | 614A | 614B | 318 | 319 | 320 | 321 | 322 |
|---|---|---|---|---|---|---|---|---|---|---|---|
| Brick properties green: | | | | | | | | | | | |
| Bulk density, oz./cu. in | 1.718 | 1.741 | 1.771 | | | | 1.751 | 1.743 | 1.716 | 1.685 | 1.657 |
|  | 1.690 | 1.705 | 1.724 | | | | 1.719 | 1.699 | 1.673 | 1.628 | 1.606 |
| Modulus of rupture, p.s.i | 1,570 | 1,692 | 1,761 | | | | 1,682 | 1,388 | 1,273 | 1,024 | 1,016 |
|  | 1,507 | 1,617 | 1,435 | | | | 1,683 | 1,248 | 1,120 | 802 | 822 |
| Cold crushing strength, p.s.i | 7,849 | 7,863 | 8,126 | | | | 6,912 | 5,484 | 4,733 | 4,044 | 3,290 |
|  | 6,013 | 5,589 | 6,557 | | | | 4,857 | 4,254 | 3,515 | 3,104 | 2,867 |
| Loss on ignition, percent | 5.62 | 5.37 | 5.51 | | | | 5.41 | 4.39 | 5.59 | 5.40 | 5.29 |
| Volatiles, percent | 2.23 | 2.07 | 2.15 | | | | 2.06 | 2.11 | 2.18 | 2.13 | 2.02 |
| Fixed carbon, percent | 3.39 | 3.30 | 3.36 | | | | 3.35 | 3.28 | 3.41 | 3.27 | 3.27 |
| Carbon residue, percent | 60.32 | 61.45 | 60.98 | | | | 61.92 | 60.85 | 61.00 | 60.56 | 61.81 |
| Brick properties tempered, 550° F., 20 hours: | | | | | | | | | | | |
| Bulk density, oz/cu. in | 1.719 | 1.720 | 1.714 | 1.700 | 1.721 | 1.724 | 1.687 | 1.674 | 1.648 | 1.624 | 1.640 |
|  | 1.699 | 1.697 | 1.697 | 1.713 | | | 1.662 | 1.645 | 1.620 | 1.592 | 1.593 |
|  |  |  |  | 1.729 | | | | | | | |
| Modulus of rupture, p.s.i | 1,319 | 1,277 | 1,121 | 1,343 | 1,237 | 1,318 | 1,090 | 1,064 | 696 | 663 | 744 |
|  | 1,114 | 1,058 | 1,131 | 1,365 | | | 829 | 1,016 | 661 | 585 | 654 |
|  |  |  |  | 1,364 | | | | | | | |
| Cold crushing strength, p.s.i | 4,740 | 4,498 | 3,897 | 5,452 | 3,625 | 5,882 | 3,060 | 3,380 | 2,890 | 2,420 | 3,754 |
|  | 4,148 | 4,083 | 3,252 | 5,433 | | | 3,861 | 3,300 | 2,908 | 2,154 | 2,717 |
|  |  |  |  | 4,261 | | | | | | | |
| Compressive strength, 300° F. (p.s.i.) | 107 | 90 | 113 | 407 | 304 | 378 | 109 | 90 | 126 | 239 | 607 |
|  | 181 | 269 | 192 | 1,247 | | | 144 | 209 | 368 | 639 | 1,002 |
|  |  |  |  | 322 | | | | | | | |
| Loss on ignition, percent | 5.34 | 5.48 | 5.72 | 4.92 | 5.10 | 5.57 | 5.24 | 5.14 | 5.30 | 5.09 | 5.26 |
|  | 5.31 | 5.22 | 5.68 | 4.96 | | | 5.16 | 5.18 | 5.05 | 5.25 | 5.20 |
|  |  |  |  | 5.18 | | | | | | | |
| Volatiles, percent | 1.92 | 1.93 | 1.99 | 1.48 | 1.45 | 1.83 | 1.80 | 1.70 | 1.67 | 1.43 | 1.23 |
|  | 1.76 | 1.73 | 1.97 | 1.24 | | | 1.65 | 1.57 | 1.45 | 1.31 | 1.02 |
|  |  |  |  | 1.28 | | | | | | | |
| Fixed carbon, percent | 3.42 | 3.55 | 3.73 | 3.44 | 3.65 | 3.74 | 3.44 | 3.44 | 3.63 | 3.66 | 4.03 |
|  | 3.55 | 3.49 | 3.71 | 3.72 | | | 3.51 | 3.61 | 3.60 | 3.74 | 4.18 |
|  |  |  |  | 3.90 | | | | | | | |
| Carbon residue, percent | 64.04 | 64.78 | 65.21 | 69.91 | 71.57 | 67.15 | 65.65 | 66.93 | 68.49 | 71.91 | 76.62 |
|  | 64.85 | 66.86 | 65.32 | 75.00 | | | 68.02 | 69.69 | 71.29 | 75.05 | 80.38 |
|  |  |  |  | 75.29 | | | | | | | |
| Burn-in rating (U.S. Steel) | 1 | 1 | 1 | 1 | 1 | 1 | 1 | 2 | 1 | 1 | 1 |
|  | 1-2 | 1 | 1 | 1 | | | 1 | 1 | 1 | 1 | 1 |
| OSM slag erosion, inches | 0.13 | 0.03 | 0.01 | 0.34 | 0.24 | 0.02 | 0.15 | 0.14 | 0.07 | 0.10 | 0.00 |
|  | 0.29 | 0.03 | 0.03 | 0.28 | | | 0.31 | 0.42 | 0.42 | 0.21 | 0.27 |
|  |  |  |  | 0.22 | | | | | | | | pression strength at 300° F., carbon residue and low slag attack in the O.S.M. slag erosion test.

In the O.S.M. slag erosion test values included in Table 9, the standard used in the test involving the high density brick was a Peratex brick which gave a slag erosion value of 0.14 inch. The standard used in the O.S.M. slag erosion tests for the low density brick was a Peratex brick which gave a slag erosion value of 0.01 inch.

Table 10 shows slag erosion test values made on a repeat of certain of the tests shown in Table 9, and also average slag erosion values for Tables 9 and 10 combined. In the repeat tests for Mix Nos. 318, 319 and 320, the bricks were compared with one another, and in the repeat tests for Mix Nos. 321 and 322, the standards used were Ferrox VIII brick, one of which gave a slag erosion value of 0.01 inch and the other a slag erosion value of 0.0 inch. It will be noted that in both tests Mix 322 gave splendid results.

TABLE 10

| Mix No | 318 | 319 | 320 | 321 | 322 |
|---|---|---|---|---|---|
| Brick properties tempered, 550° F. 20 hours (O.S.M. slag erosion, inches): | | | | | |
| Repeat values | 0.08 | 0.18 | 0.28 | 0.05 | 0.0 |
| | 0.20 | 0.34 | 0.08 | 0.10 | 0.21 |
| Average values | 0.12 | 0.16 | 0.18 | 0.08 | 0.00 |
| | 0.26 | 0.38 | 0.25 | 0.16 | 0.24 |

When reference is made to mesh it is intended to refer to Tyler standard mesh per linear inch.

O.S.M. SLAG EROSION TEST

This is a procedure for determination of the relative resistance against slag erosion of tar or pitch bonded brick using a simulated O.S.M. test furnace.

Figure 2:
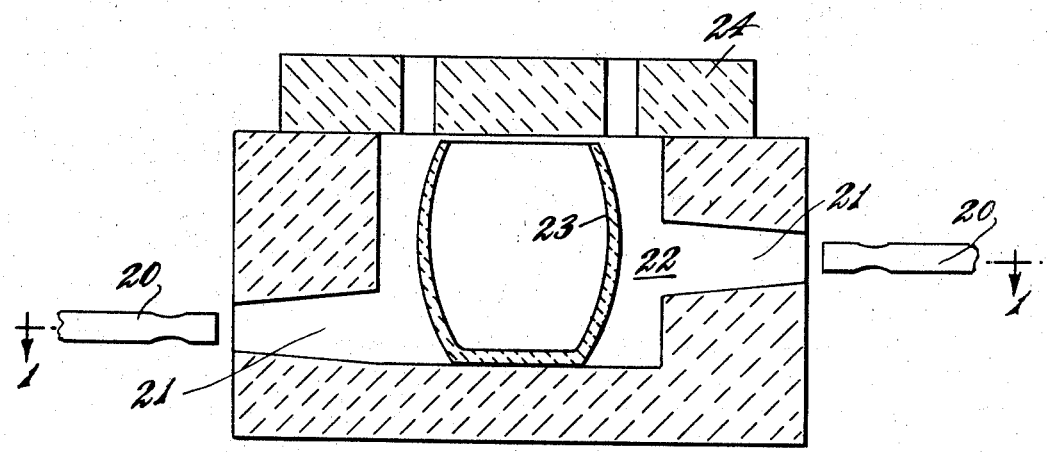
FIGURE 2 is a vertical section of the pig iron melting furnace of FIGURE 1, the section being taken on the line 2—2 of FIGURE 1.

Pig iron is melted in a pot furnace as shown in plan in FIGURE 1 fired by burners 20 introducing gas in tangential ports 21 into a furnace chamber 22 having a crucible 23 accessible for removal by removing a ported cover 24, as shown in FIGURE 2. The furnace is capable of reaching a temperature of 2500° F. in four to five hours and has an overall size of 34 inches and a height of 18 inches.

The pig iron composition is approximately 1% silicon, 0.02% titanium and 0.3% manganese by weight, the balance being usual carbon content and iron.

Figure 3:
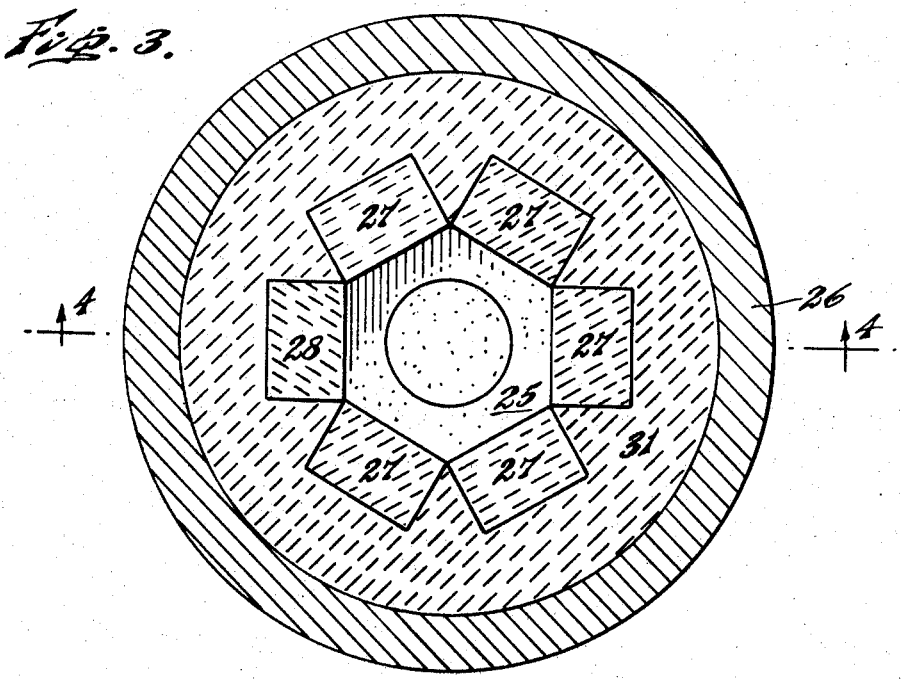
FIGURE 3 is a plan section of a refractory test furnace used in making the O.S.M. slag erosion test, omitting the oxygen blowing pipe. The section is taken on the line 3—3 of FIGURE 4.
Figure 4:
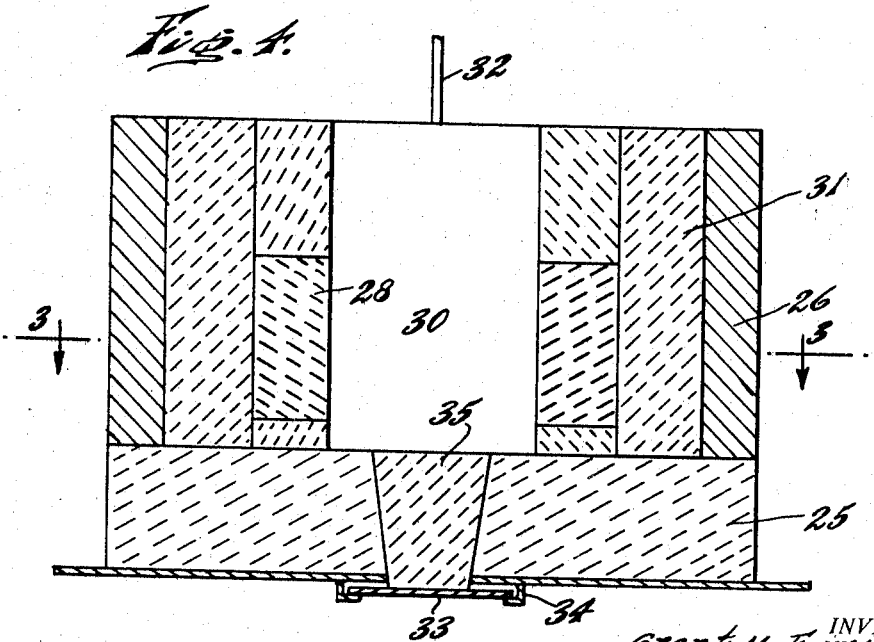
FIGURE 4 is a vertical section of FIGURE 3 on the line 4—4.

FIGURES 3 and 4 show the O.S.M. refractory test furnace which is about 24 inches in diameter and 12 inches above the base.

The specimens used are bricks 6 inches high by 4½ inches wide to 2½ to 3 inches thick.

The specimens and a standard reference sample are tested in the O.S.M. test furnace shown in FIGURES 3 and 4 at one time. At least two specimens should be tested per sample lot preferably on two different runs. Before testing, the thickness of the specimens and the standard sample are carefully measured.

The O.S.M. furnace comprises a refractory base 25 supporting a metallic housing 26 and having set up in a hexagonal shape within it a series of bricks including test specimens 27 and the reference sample 28, leaving an internal space 30. The space between the housing 28 and the bricks 27 is filled with magnesite grains 31 on 8 mesh per linear inch.

An oxygen lance 32 of 3/16 inch internal diameter is provided. The lance is of impervious alumina Norton 232 24 inches long. The oxygen is capable of being metered and controlled from 0.1 to 10 s.c.f.m. at 50 p.s.i. The oxygen lance is placed exactly vertically at the center of the furnace with the lower tip flush with the top of the furnace as shown.

80 to 100 pounds of pig iron of the required analysis are placed in the melting crucible shown in FIGURES 1 and 2 and heated to 2500° F. as determined by a pyrometer, the molten pig iron being agitated carefully to break up any slag which might otherwise accumulate at the surface.

Low ash coke of ½ inch particle size is heated to incandescence in a coke pot consisting of an 8.5 gallon steel drum lined with 1 to 2 inches of plastic refractory, heat being supplied by a gas burner. The heated coke is then transferred to the interior of the O.S.M. furnace until it fills the furnace about 4 inches deep and the oxygen flow is continually adjusted so that the temperature rises at a constant rate of 100° F. per minute until it reaches 2,000° F. in 20 minutes. A cover of magnesite brick is placed on the top of the O.S.M. furnace. The O.S.M. furnace is then brought to a temperature of 2500 to 2600° F. and held for 20 minutes adding additional hot coke if necessary to maintain the temperature.

Approximately 20 pounds of molten pig iron is then transferred to the interior of the O.S.M. furnace and oxygen is blown into the molten pig iron at a rate of 4 s.c.f.m. under a pressure of 50 p.s.i. Within two minutes a carbon boil starts as indicated by the evolution of heavy dark brown smoke.

540 grams of lime (Baker and Amandson 1545 lump NF calcium oxide) and 135 grams of sand, ganister through 14 mesh (Claysburg Works) are then added to the test furnace and the oxygen flow increased to 55 s.c.f.m. If necessary the top surface of the melt can be probed with a steel rod in order to start the slag reaction. The flow is continued until a froth foaming appearance of the slag has changed to a smooth level slag surface. This may require 15 minutes or longer. The oxygen flow is then decreased to about 0.5 s.c.f.m. and the furnace is tapped by removing steel plate 33 from its guideway 34 at the bottom and loosening refractory grains 35 with a weighted steel rod.

The steel plate 33 is then restored and suitable refractory grains are introduced at 35 to fill the tap hole and a small amount of hot coke in the space 30 inside the furnace, the oxygen flow is increased to about 4 s.c.f.m. and the operation is repeated.

After completion of four such cycles, the furnace is allowed to cool and the test specimens and the reference sample are removed. The brick are cut through the center transverse to the hot face from top to bottom and their thickness is measured at the point of greatest erosion.

CARBON RESIDUE IN PITCH AND TAR BONDED BRICK

Figure 5:
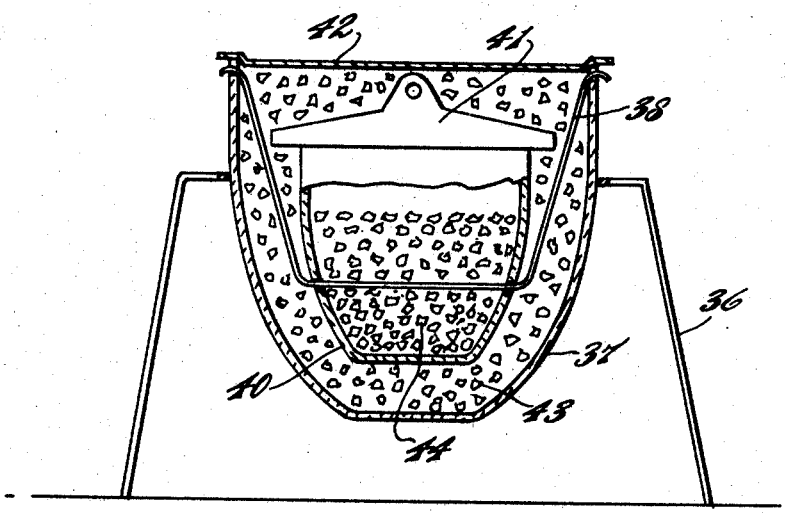
FIGURE 5 is a diagrammatic central vertical section of test apparatus for determining carbon residue in tar and pitch bonded refractory brick.

In this procedure an electric furnace is used as shown in FIGURE 5 having triangle 36 supporting a nickel crucible 37 in which is positioned a wire hook and ring 38 which supports a porcelain crucible 40 having a lid 41. The nickel crucible is covered by a nickel lid 42. Calcined coke of the character above described fills the space 43 between the nickel crucible and the porcelain crucible and the sample is placed inside the porcelain crucible at 44. The entire structure is placed in an electric furnace not shown.

The sample is of 1 inch thick cross section taken from three specimens to form a composite sample, crushed in a laboratory jaw crusher to pass a 4 mesh screen. Using a sample splitter an approximate 50 gram portion of the crushed sample is used for analysis.

The entire 50 gram sample is transferred to a tared porcelain crucible 40 and weighed and then the porcelain lid is placed on the crucible and the crucible is placed in the wire hook and ring 38. The ⅜ inch bed of crushed coke is positioned in the bottom of nickel crucible 37 and then the porcelain crucible is put in place supported by the wire hook and ring and the space left within the nickel crucible is filled with crushed coke up to just below the nickel cover. The triangle 36 is then put in place and the entire construction is supported in the electric furnace. The electric furnace has previously been preheated to a temperature of 625° C. The specimens are heated in the electric furnace for exactly 2½ hours and then removed and allowed to cool for 15 minutes. The porcelain crucible 40 is then removed from the coke by the wire hook and ring and all traces of coke are removed from the crucible 40 and cover and then the crucible, cover and contents are weighed.

Finally the crucible 40 and the sample after removing the lid are ignited at 1,000° C. for 6 hours and then cooled to room temperature and weighed.

The percentage of volatiles are determined by the weight of the sample plus crucible before heating to 625° C. minus the weight of the sample plus crucible after heating to 625° C. divided by the weight of the sample before heating and multiplied by 100.

The percentage of residual carbon is determined by the weight of the sample plus crucible after heating to 625° C. minus the weight of the ignited sample plus crucible after heating to 1,000° C. divided by the weight of the initial sample times 100.

COMPRESSIVE AND TRANSVERSE STRENGTHS OF TAR AND PITCH BONDED BRICK AT 1300° F.

A forced circulation oven is used with a controllable temperature range from room temperature to 400° F.

For a crushing test specimens are cut from either 2½ or 3 inch brick of a length of 6 inches and a width of between 2½ inches and 3 inches.

To determine the modulus of rupture the specimens are cut from either 2½ inch to 3 inch brick of a length of 9 inches and a width of between 2¼ and 4½ inches.

The width and thickness of all specimens are measured and two specimens cut from different brick are tested as a minimum.

The oven is heated to 315° F. and held at this temperature. The specimens are placed in the oven and heated for exactly two hours. At the end of the heating period, the specimens will have reached a minimum average temperature of 305° F., thus allowing for a 5° drop in temperature during testing. Approximately 15 minutes before testing two specimens are placed in a transfer pan made like a box of mill board and preheated and a preheated cover is placed on the pan. The specimens are then immediately taken to a compressive testing machine and the tests are made as quickly as possible using the standard loading rate. For the compressive tests, a spherical bearing block is placed on the lower platen of the machine and a pad of ¼ inch mill board is placed between each end of the specimen and the bearing surface.

For the modulus of ruptured test, the bearing edges are placed so as to provide a 7 inch span.

In view of our invention and disclosure variations and modifications to meet individual whim or particular need will doubtless become evident to others skilled in the art, to obtain all or part of the benefits of our invention without copying the process and composition shown, and we therefore claim all such insofar as they fall within the reasonable spirit and scope of our claims.

Having thus described our invention what we claim as new and desire to secure by Letters Patent is:

1. A process of making a basic refractory brick of superior performance in a lining of a steel-making furnace in contact with a molten bath, which comprises hot mixing from 3 to 8% of pitch on the weight of the dry refractory, with from 55 to 90% by weight of coarse basic refractory particles having a size range between 2½ and 28 mesh per linear inch, and with from 10 to 45% by weight of intermediate basic refractory particles having a size range between 28 and 325 mesh per linear inch, there being not more than 7% by weight of particles finer than 325 mesh per linear inch, hot molding the mix into brick at a pressure in excess of 10,000 p.s.i., and tempering the brick at a temperature of between 400 and 600° F. for a time of at least five hours, said refractory brick being suitable for use without kiln firing.

2. A process of claim 1, in which the brick mix includes from 60 to 80% by weight of coarse particles.

3. A process of claim 2, in which the brick mix includes from 20 to 40% by weight of intermediate particles.

4. A process of claim 1, in which the brick mix includes from 20 to 40% by weight of intermediate particles.

5. A process of claim 1, which comprises hot mixing from 27.5 to 42.5% by weight of coarse-coarse basic refractory particles having a maximum of 10% by weight on 2½ mesh per linear inch and a minimum of 90% by weight on 8 mesh per linear inch and between 27.5 and 42.5% by weight of fine-coarse basic refractory particles having a maximum of 10% by weight on 6 mesh per linear inch and a minimum of 90% by weight on 28 mesh per linear inch, along with said intermediate particles.

6. A process of claim 1, in which the basic refractory particles are of a class consisting of particles of magnesia, calcined dolomite, lime, forsteritic basic refractory and mixtures thereof.

7. A process of claim 1, in which the basic refractory particles are of magnesia.

8. A process of claim 1, which comprises substantially eliminating from the refractory mix particles through 325 mesh per linear inch.

9. A process of claim 1, in which the quantity of pitch on the weight of the dry refractory is between 5 and 7%.

10. A process of claim 1, which comprises molding the mix into brick at a pressure between 10,000 and 15,000 p.s.i.

11. A process of claim 1, which comprises tempering the brick at a temperature of between 525 and 600° F. for a time of at least fifteen hours.

12. A tempered unfired pitch bonded basic refractory brick, comprising coarse and intermediate sized basic refractory particles, substantially free from basic refractory particles finer than 325 mesh per linear inch, having after tempering a compressive strength at 300° F. of more than 100 p.s.i., having a carbon residue higher than 68% by weight of the pitch added, and having an O.S.M. slag erosion test value of less than 0.15 inch.

13. A tempered unfired basic refractory brick which comprises from 55 to 90% by weight of coarse basic refractory particles of a size range between 2½ and 28 mesh per linear inch, between 10 and 45% by weight of intermediate basic refractory particles of a size range between 28 and 325 mesh per linear inch, not more than 7% by weight of basic refractory particles finer than 325 mesh per linear inch, and between 3 and 8% on the weight of the dry refractory of pitch, the pitch bonding the basic refractory particles together, and the basic refractory brick after tempering having a compressive strength at 300° F. of more than a 100 p.s.i., having a carbon residue higher than 68%, and having an erosion in the O.S.M. slag erosion test of less than 0.15 inch.

14. A refractory brick of claim 13, having after tempering a compressive strength at 300° F. of more than 400 p.s.i.

15. A refractory brick of claim 13, having after tempering a carbon residue higher than 71% on the weight of the pitch added.

16. A refractory brick of claim 13, having after tempering a penetration in the O.S.M. slag erosion test of less than 0.05 inch.

17. A refractory brick of claim 13, which is substantially free from particles finer than 325 mesh per linear inch.

18. A refractory brick of claim 13, having between 60 and 80% by weight of coarse basic refractory particles.

19. A refractory brick of claim 18, having between 20 and 40% by weight of intermediate basic refractory particles.

20. A refractory brick of claim 13, having between 20 and 40% by weight of intermediate basic refractory particles.

21. A refractory brick of claim 13, having between 27.5 and 42.5% by weight of coarse-coarse particles having a maximum of 10% by weight on 2½ mesh per linear inch and a minimum of 90% by weight on 8 mesh per linear inch, and between 27.5 and 42.5% by weight of fine-coarse particles having a maximum of 10% by weight on 6 mesh per linear inch and a minimum of 90% by weight on 28 mesh per linear inch.

22. A refractory brick of claim 13, in which the basic refractory particles are of a class consisting of particles of magnesia, calcined dolomite, lime, forsteritic basic refractory and mixtures thereof.

23. A refractory brick of claim 13, in which the basic refractory particles are of magnesia.

24. A refractory brick of claim 13, in which the concentration of pitch on the dry weight of the brick is between 5 and 7%.

References Cited

UNITED STATES PATENTS

| | | | |
|---|---|---|---|
| 3,015,850 | 1/1962 | Rusoff et al. | 106—56 |
| 3,233,017 | 2/1966 | Weaver et al. | 106—58 |
| 3,168,602 | 2/1965 | Davies et al. | 106—63 |

JAMES E. POER, *Primary Examiner.*

U.S. Cl. X.R.

106—56, 63